United States Patent
Chen et al.

(10) Patent No.: US 11,909,782 B2
(45) Date of Patent: Feb. 20, 2024

(54) SYSTEMS AND METHODS FOR USING MACHINE LEARNING TECHNIQUES FOR NETWORK-IMPLEMENTED SPAM CALL DETECTION

(71) Applicant: Verizon Patent and Licensing Inc., Basking Ridge, NJ (US)

(72) Inventors: Daniel Chen, Harrison, NJ (US); Federico Zarfati, New York, NY (US); Stuart R. Burkhart, Keller, TX (US); Chiang Ming Yang, Cupertino, CA (US); Aude Claire Marzuoli, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 17/659,509

(22) Filed: Apr. 18, 2022

(65) Prior Publication Data
US 2022/0239707 A1 Jul. 28, 2022

Related U.S. Application Data

(63) Continuation of application No. 16/899,790, filed on Jun. 12, 2020, now Pat. No. 11,330,023.

(51) Int. Cl.
*H04L 65/1076* (2022.01)
*G06N 20/00* (2019.01)
*H04W 80/10* (2009.01)

(52) U.S. Cl.
CPC ......... *H04L 65/1079* (2013.01); *G06N 20/00* (2019.01); *H04W 80/10* (2013.01)

(58) Field of Classification Search
CPC .... H04L 65/1079; G06N 20/00; H04W 80/10
See application file for complete search history.

(56) References Cited

U.S. PATENT DOCUMENTS

| 10,362,172 B2 | 7/2019 | Strong et al. |
| 11,019,090 B1 * | 5/2021 | Smith ............ G06F 21/40 |
| | | (Continued) |

OTHER PUBLICATIONS

"Hiya—Call Blocker, Fraud Detection & Caller ID", Hiya Inc., Google Play Store (visited May 8, 2020).
(Continued)

*Primary Examiner* — Charles C Jiang
*Assistant Examiner* — Shawn D Miller

(57) ABSTRACT

A system described herein may provide a technique for Embodiments described herein provide for the use of machine learning, artificial intelligence, and/or other techniques for network-implemented spam call detection. Calls may be screened prior to notifying a called User Equipment ("UE") that a call has been placed to the called UE. A Machine Learning Spam Detection Component ("MLSDC") may screen a call, such as a voice call, by initiating a call session between the MLSDC and a calling UE, from which the call was requested. Via the established call session, the MLSDC may receive communications, such as voice communications, from the UE, and may determine a measure of likelihood that the call request is associated with spam by using machine learning or other techniques to compare the received communications against one or more models that indicate attributes of calls that have been identified as spam.

20 Claims, 9 Drawing Sheets

(56) References Cited

U.S. PATENT DOCUMENTS

2017/0134574 A1* 5/2017 Winkler .............. H04L 63/0861
2019/0362057 A1 11/2019 Keret et al.
2020/0045168 A1* 2/2020 Sinha ................ H04M 3/42042

OTHER PUBLICATIONS

"Protect yourself from scam calls and voicemails", YouMail Free App, (available at https://www.youmail.com/home/free-app, visited May 8, 2020).

"YouMail stops over 1 million bad guys from ringing your phone!", YouMail Free App, (available at hllps://www.youmail.com/home/download?src=free-app, visited May 8, 2020).

"Your Reputation precedes you", Hiya Inc., (available at https://hiya.com/connect/reputation, visited May 8, 2020).

Eckel, "Real-time Transport Protocol (RTP) Recommendations for SIPREC", SIPREC Working Group, Jun. 13, 2011 (available at https://tools.ietf.org/id/drafl-eckel-siprec-rtp-rec-00.html, visited May 11, 2020).

Johnston, et al., "RFC 5359: Session Initiation Protocol Service Examples", IETF Network Working Group. (Year: 2008).

Powell, "Hiya Extends Partnership with Samsung to Bring its Leading Caller and Business Profile Services to the Note 8", GlobeNewswire, Aug. 23, 2017 (available at https://www.globenewswire.com/news-elease/2017/08/23/1312640/0/en/Hiya-Extends-Partnership-with-Samsung-to-Bring-its-Leading-Caller-and-Business-Profile-Services-to-the-Note-8.html, visited May 8, 2020).

Ravindranath, "Session Initiation Protocol (SIP) Recording Call Flows", SIPREC, Dec. 19, 2016 (available at https://tools.ietf.org/pdf/draft-ietf-siprec-callflows-08.pdf, visited May 12, 2020).

* cited by examiner

SYSTEMS AND METHODS FOR USING MACHINE LEARNING TECHNIQUES FOR NETWORK-IMPLEMENTED SPAM CALL DETECTION

CROSS-REFERENCE TO RELATED APPLICATION

This application is a Continuation of U.S. patent application Ser. No. 16/899,790 filed on Jun. 12, 2020, titled "SYSTEMS AND METHODS FOR USING MACHINE LEARNING TECHNIQUES FOR NETWORK-IMPLEMENTED SPAM CALL DETECTION," the contents of which are herein incorporated by reference in their entirety.

BACKGROUND

Service providers, such as wireless networks, voice call providers, and/or other entities, may offer packet-based messaging or voice call services. Such services may be used in ways that may be undesirable to certain users, such as the use of such services to send unauthorized or undesired communications, such as voice calls. Such communications may sometimes be referred to as "spam." Session Initiation Protocol ("SIP") or other protocols may be used to facilitate or implement such services.

DETAILED DESCRIPTION OF THE PREFERRED EMBODIMENTS

Figure 1:
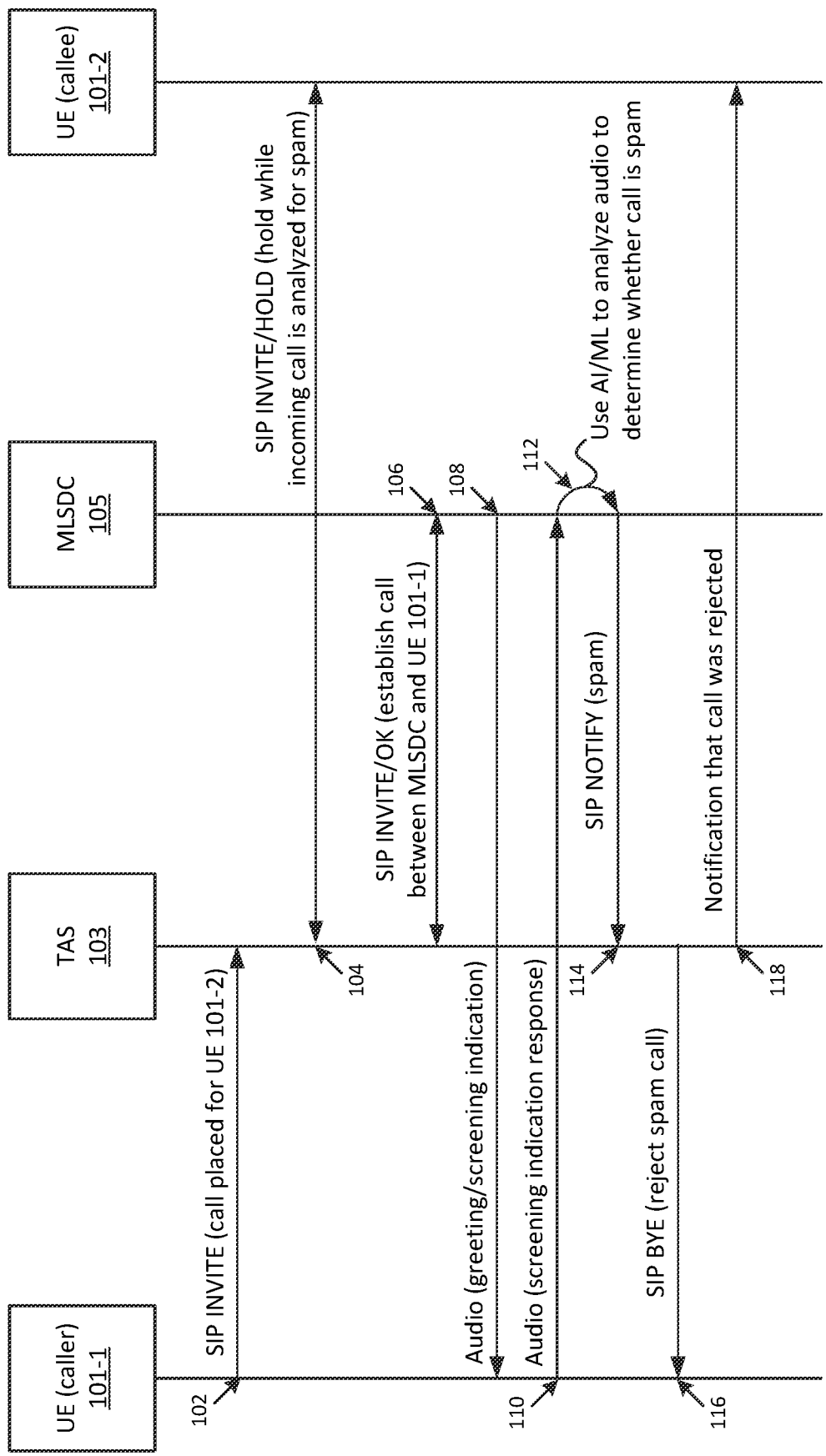
FIG. 1 illustrates an example overview of one or more embodiments described herein, in which machine learning techniques may be used for network-implemented spam call detection and rejection.

The following detailed description refers to the accompanying drawings. The same reference numbers in different drawings may identify the same or similar elements.

Embodiments described herein provide for the use of machine learning, artificial intelligence ("AI"), and/or other techniques for network-implemented spam call detection. As described herein, a wireless network may offer a service whereby calls may be screened prior to notifying a user that a call has been placed to the user. For example, as discussed below, one or more devices or systems of the wireless network may screen a call, such as a voice call, by initiating a call session between a Machine Learning Spam Detection Component ("MLSDC") of the wireless network and a User Equipment ("UE") from which the call was requested. The MLSDC of some embodiments may establish a call session with the UE, or "answer" the call. Via the established call session, the MLSDC may receive communications, such as voice communications, from the UE.

In accordance with some embodiments, the MLSDC may analyze the received communications using machine learning, AI, and/or other suitable techniques, to determine whether the communications should be classified as "spam." As referred to herein, the term "spam" refers to communications which are, or are likely to be, undesirable for called parties to receive. For example, the MLSDC may use Natural Language Processing ("NLP"), pattern matching, and/or other suitable techniques to identify words and/or phrases included in the communications, use voice recognition techniques and/or other types of audio analysis to identify voice signatures or other audible features included in the communications, and/or other suitable types of analysis. In some embodiments, the MLSDC may identify spam, or potential spam, based on a lookup of an identifier of a calling UE (e.g., a Mobile Directory Number ("MDN") or some other suitable identifier) against one or more data sources that provide information regarding whether particular UE identifiers are associated with spam. Based on the above factors, and/or one or more other factors, the MLSDC may generate a score or some other indicator of whether a particular call should be classified as spam, and/or a likelihood that the particular call should be classified as spam. As discussed below, such indicator or score may be used by the wireless network to determine whether to reject the call, or to allow the call to be placed or established as requested. The terminology "call is spam" (or similar terminology) may be used herein for the sake of brevity when referring to a "call that is classified as spam."

Embodiments described herein may therefore use machine learning, AI, and/or other suitable techniques to analyze attributes of a call or a caller in order to determine whether the call should be classified as spam, and may therefore provide enhanced spam screening functionality as compared to spam detection techniques that rely solely on a calling party's telephone number.

As shown in FIG. 1, UE 101-1 (sometimes referred to herein as "caller" or "calling UE") may output (at 102) a call request to establish a call between UE 101-1 and UE 101-2 (sometimes referred to herein as "callee" or "called UE"). In some embodiments, the request may be in the form of, and/or may include, a SIP message, such as a SIP INVITE message. The request may be received by Telephony Application Server ("TAS") 103. In some embodiments, TAS 103 may be part of, and/or may be communicatively coupled to, an Internet Protocol ("IP") Multimedia Subsystem ("IMS") associated with a wireless network, such as a Long-Term Evolution ("LTE") wireless network, a Fifth Generation ("5G") wireless network, or some other type of wireless network. In some embodiments, TAS 103 may implement SIP messaging. In some embodiments, TAS 103 may implement one or more other APIs for call handling in addition to, or in lieu of, SIP. In some embodiments, while not shown here, the request may be forwarded by one or more devices or systems, such as one or more Call Session Control Functions ("CSCFs").

Based on receiving (at 102) the call request from calling UE 101-1, TAS 103 may notify (at 104) callee UE 101-1 of the received request. For example, TAS 103 may output a notification, such as a SIP INVITE message, to callee UE 101-1. Additionally, or alternatively, TAS 103 may output a SIP NOTIFY message to callee UE 101-1. In some embodiments, the message (sent at 104) may include an indication that the message is from TAS 103, may indicate that the call request is potentially spam, and/or may otherwise provide an option to allow for further analysis of the call request to determine whether the call request is spam.

For example, in some embodiments, prior to outputting (at 104) the notification to callee UE 101-1, TAS 103 may perform a preliminary spam detection process to determine whether a call can be quickly determined to be spam, and/or for a preliminary score to be assigned based on attributes associated with the call request or the caller. For example, TAS 103 may perform, either alone or in concert with another device or system, a spam analysis based on a MDN or other identifier associated with UE 101-1. For example, TAS 103 may perform a lookup of the MDN of UE 101-1 against a list of MDNs that have been determined to be associated with spam calls. Additionally, or alternatively, TAS 103 may utilize any other suitable technique to determine, based on the MDN or other identifier of UE 101-1, whether the call request is with spam, and/or a likelihood that the call request is spam. For example, TAS 103 may determine an initial spam score associated with the call request based on the MDN. In some embodiments, TAS 103 may outright reject a call, without further processing, if a particular initial spam score associated with a particular call request exceeds a threshold score. In this manner, the callee may not need to be notified of the call, and network resources may not need to be expended to perform the subsequent operations discussed below.

As mentioned above, the notification (provided at 104) may include an indication of the likelihood that the call request is spam, such as the initial spam score determined or generated by TAS 103. In some embodiments, callee UE 101-1 may implement an application programming interface ("API"), via which callee UE 101-1 may receive the notification and determine how the call request should be handled. For example, the API may be configured to present a prompt to a user of callee UE 101-1, asking for input indicating how the user would like to handle the call request. Such options may include answering the call, sending the call to voicemail, rejecting the call, or initiating an enhanced spam detection service offered by TAS 103 (e.g., as implemented by MLSDC 105). In some embodiments, the API may present such options in some scenarios, such as if the initial spam score is above a certain threshold, below a certain threshold, and/or within a certain range. In other scenarios, the API may perform certain actions (e.g., accept, reject, send to voicemail, or initiating the enhanced spam detection) automatically, without user intervention, and/or without notifying the user that a call has been requested.

In situations where the enhanced spam detection option has been selected (e.g., by a user of UE 101-2, or automatically by UE 101-2), callee UE 101-2 may output (at 104) a message to TAS 103, indicating that the call request should be further analyzed for spam. For example, callee UE 101-2 may output a SIP CALL HOLD message to TAS 103 and/or some other type of message. Based on this message, callee UE 101-2 and/or TAS 103 may place the call in a "hold" state while the call request is further analyzed in accordance with embodiments described herein.

For example, as further shown, TAS 103 may establish (at 106) a call between TAS 103 and calling UE 101-1. The call establishment process may include one or more SIP messages, such as a SIP INVITE message, and/or one or more Session Recording Protocol ("SIPREC") messages to establish a call recording session and/or otherwise facilitate delivery of call audio from UE 101-1 to MLSDC 105. A detailed example of this call establishment process is described below with respect to FIG. 3.

Once the call has been established between calling UE 101-1 and MLSDC 105, MLSDC 105 may output (at 108) a greeting to calling UE 101-1. The greeting may include an audio greeting in situations where the established call is a voice call. Additionally, or alternatively, the greeting may include video in situations where the established call is an audiovisual call (also sometimes referred to as a "video call"). In some embodiments, the greeting may include an audible prompt indicating that the call is being screened, may include a request for the caller's name or purpose for calling, and/or some other type of greeting or prompt. MLSDC 105 may receive (at 110) a response to the greeting, which may include a caller's voice, a recording, or other audio (and/or video, when suitable) information.

In accordance with embodiments described herein, MLSDC 105 may use AI, machine learning, and/or other suitable techniques to determine (at 112) whether the call request is spam. For example, as noted above, MLSDC 105 may analyze the received audio to identify words and/or phrases, based on which the call request may be classified as spam and/or otherwise scored based on likelihood of spam. For example, the words "free," "pharmacy," "lucky," the phrases "you've won," "online pharmacy," "cardmember services," or other particular words or phrases may increase the likelihood that a given call request will be classified as spam.

In some embodiments, the particular words or phrases that may be used to classify the call request as spam may be determined using AI, machine learning, and/or other techniques. For example, MLSDC 105 may receive, generate, and/or modify a machine learning model, predictive model, and/or other type of model that may be used to classify certain words or phrases as spam. As discussed below (e.g., with respect to FIG. 5), the model may be refined on an ongoing basis to improve the accuracy of the model.

As another example, MLSDC 105 may analyze the received audio to identify a particular sound signature or other audible features. For example, MLSDC 105 may perform voice recognition or other suitable techniques to identify a particular voice in the audio (received at 110). In some embodiments, MLSDC 105 may identify audio features and/or perform analyses of audio features such as dropped frames, robotization, frequency spectrum, audio chromagrams, spectral centroids, spectral bandwidths, spectral roll-offs, zero crossing rates, Mel-frequency cepstral coefficients, and/or other audible features or analyses. Such features may be caused by, and therefore, may be indicative of, types of hardware used to make the call (e.g., particular make or model of phone or other device), types of recording devices used to record audio played back during the call (e.g., particular make or model of a microphone, recorder, or the like, in situations where a recording is played during the call), types of playback devices used during the call (e.g., particular make or model of a speaker or other playback device, in situations where a recording is played during the call), one or more networks via which the call has traversed, and/or other recognizable features of phenomena.

As similarly discussed above, machine learning and/or other suitable techniques may be used to generate or modify a model that may be used to identify particular features, voices, noise signatures, or the like that are classified as spam. Generally speaking, the model may indicate particular voices that have been previously identified as being associated with spam, particular networks that have been identified as being associated with spam, particular hardware types that have been identified as being associated with spam (including, for example, particular types of recording or playback devices that have been identified as being associated with automated or recorded messages), particular sets of audio features or attributes that have been identified as being associated with spam, etc. For example, a particular voice recording may be used to auto-dial a large quantity of users, using the same telephone hardware and over the same network. Detection of this particular voice in the audio (received at 110), detection of this particular telephone hardware, and/or detection of this particular network may indicate that the call request is spam, or is likely to be spam. Similarly, the presence of particular words or phrases in the audio (received at 110), which have been detected as being commonly used in spam voice recordings, may indicate that the call request is, or is likely to be, spam.

In the example shown in FIG. 1, MLSDC 105 has determined (at 112) that the call request is spam. For example, MLSDC 105 may have detected particular words or phrases that match a model used to identify spam calls, may have detected a particular voice that matches a model used to identify spam calls, and/or may have otherwise determined that the call request is spam. Based on determining (at 112) that the call request is spam, MLSDC 105 may notify (at 114) TAS 103 that the call request is spam. For example, in some embodiments, MLSDC 105 may output (at 114) a SIP NOTIFY message that includes an indicator or identifier associated with the call request (e.g., a call identifier associated with the call request, and/or a SIP address or other identifier of calling UE 101-1), as well as an indicator that the call request is spam.

Based on this notification, TAS 103 may reject (at 116) the call request. For example, TAS 103 may send a SIP BYE message or some other type of suitable message that indicates, to calling UE 101-1 and/or one or more other devices handling the call request (e.g., a CSCF) that the call request has been rejected, and/or that a communications session associated with the call request has ended. In some embodiments, TAS 103 may also output (at 118) a notification to callee UE 101-2 that the call request was rejected. In some embodiments, the API implemented by callee UE 101-2 may receive this notification, and may handle the notification in a suitable manner.

For example, in some embodiments, the API implemented by callee UE 101-2 may present a notification (e.g., a "pop-up" notification or some other type of notification) indicating that a call was rejected. In implementations where the API caused callee UE 101-2 to present an indication when the call request was received (at 104), the API may refer back to this prior call request when indicating that the call request was rejected due to spam. For example, a call log associated with callee UE 101-2 may reflect that this call request was received and subsequently rejected based on network-implemented spam detection. As another example, the API may cause the call request to be removed from a call log associated with callee UE 101-2, based on the notification that the call request was spam.

In some embodiments, as described further below, the API may determine subsequent user interactions, which may be used to train a model used by MLSDC 105 to detect spam. For example, if a user of callee UE 101-2 calls the caller back after being notified that a spam call was detected, MLSDC 105 may modify the model to indicate that attributes associated with the call request or the caller should not be classified as spam in future iterations of a spam detection process.

Figure 2:
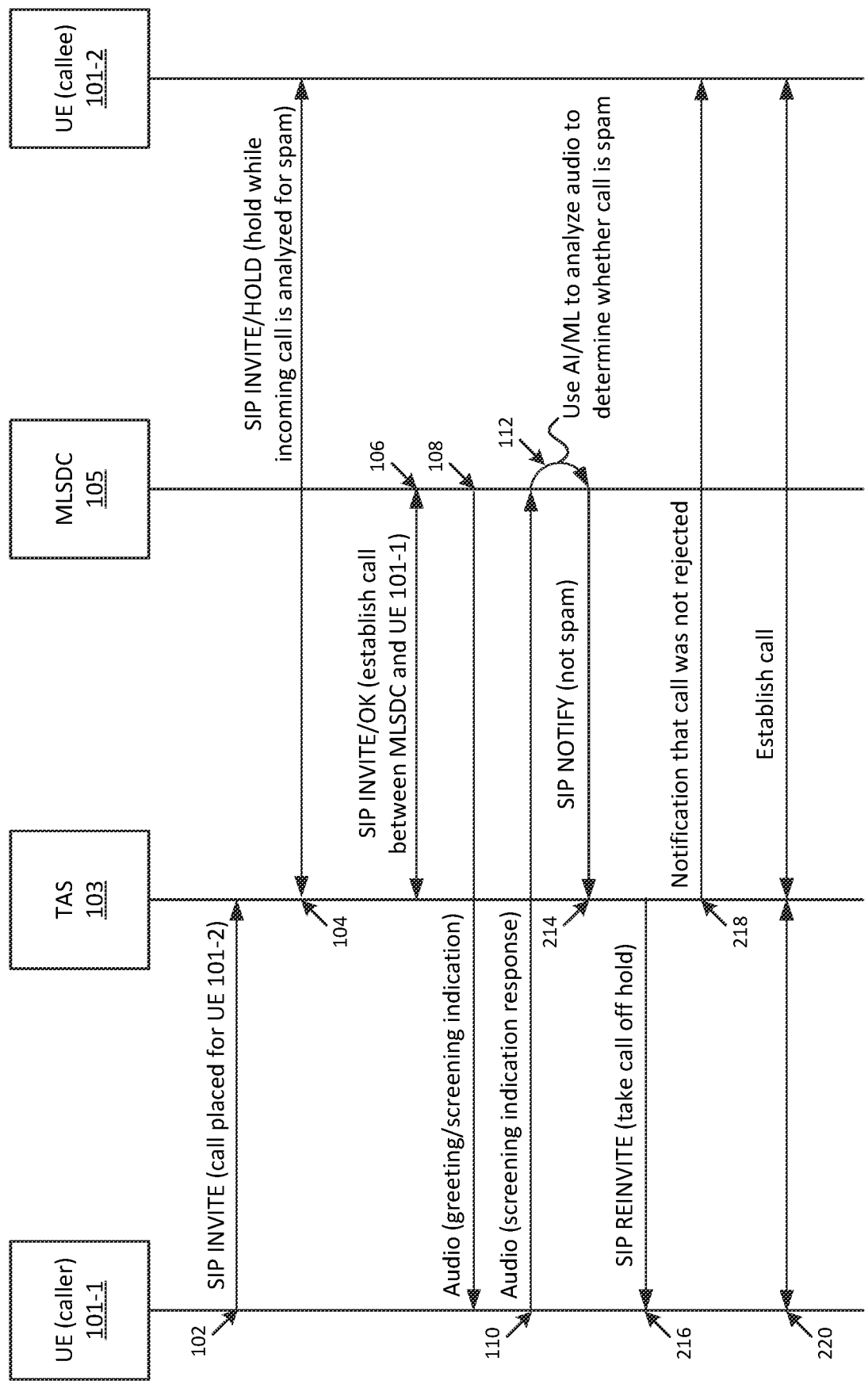
FIG. 2 illustrates an example overview of one or more embodiments described herein, in which machine learning techniques may be used to determine that a particular call request may not be spam.

FIG. 2 illustrates an example scenario in which MLSDC 105 determines that a call request is not, or is not likely to be, spam. Operations shown in FIG. 2, with the same numbering as shown in FIG. 1, are similar to those described above with respect to FIG. 1 and will not be reiterated here, for the sake of brevity.

For example, MLSDC 105 may determine (at 112) that a call request (received at 102) is not spam. Based on this determination, MLSDC 105 may notify (at 214) TAS 103 that MLSDC 105 has determined that the call request is not spam (and/or that MLSDC 105 has not determined that the call request is spam). In some embodiments, this notification may take the form of, and/or may be included in, a SIP NOTIFY message. Based on this notification, TAS 103 may perform one or more operations to establish the requested call between calling UE 101-1 and callee UE 101-2.

For example, TAS 103 may take the call off hold, which may include sending (at 216) a SIP REINVITE message to calling UE 101-1. Further, TAS 103 may output (at 218) a notification to callee UE 101-2, indicating that the call request (indicated at 104) was not rejected. For example, the API implemented by callee UE 101-2 may receive this notification, and may present a call notification (e.g., may "ring" callee UE 101-2) and/or may otherwise present a notification that the incoming call request is not spam. Assuming that the call request is answered (e.g., a user of callee UE 101-2 chooses to accept the call request), TAS 103, calling UE 101-1, and callee UE 101-2 may establish (at 220) the call. In some embodiments, the call establishment (at 220) may include one or more messages, such as SIP messages, which are not discussed in detail here. In some embodiments, one or more other devices or systems, such as one or more CSCFs, may also be involved in the messaging to establish (at 220) the call.

Figure 3:
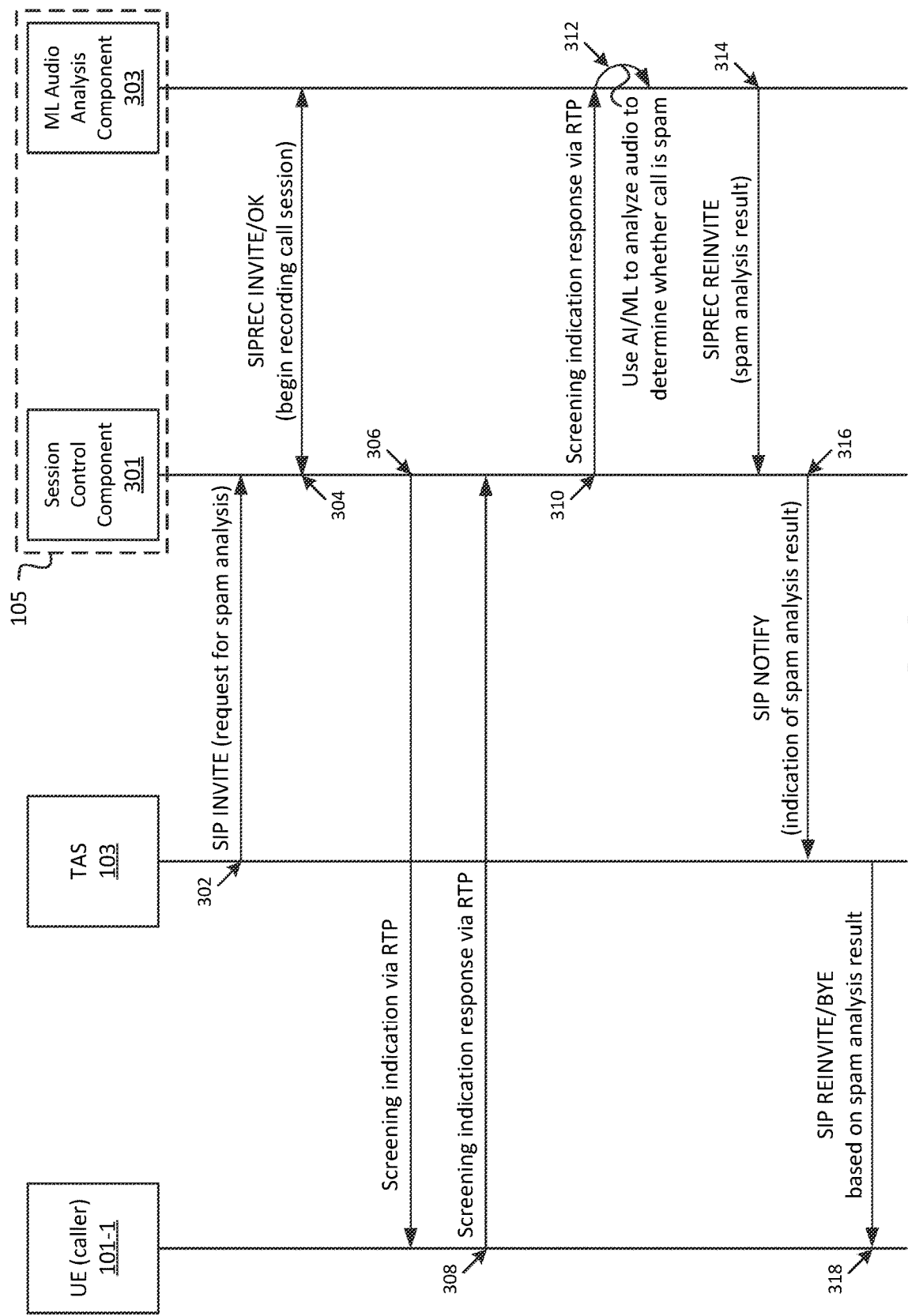
FIG. 3 illustrates example signaling to perform audio analysis of a call, using machine learning techniques, to determine whether the call request is spam.

FIG. 3 illustrates example signaling to perform audio analysis of a call request, in accordance with some embodiments. As shown, for example, MLSDC 105 may include, or be implemented by, multiple components such as Session Control Component 301 and Machine Learning Audio Analysis Component ("MLAAC") 303, in some embodiments. In some embodiments, Session Control Component 301 may include, and/or may implement, a Session Border Controller ("SBC"). The example process shown in FIG. 3 may be performed in concert with and/or in parallel with operations described above with respect to FIGS. 1 and/or 2. Further, some operations shown in FIG. 3 may correspond to operations shown in FIGS. 1 and/or 2. For example, operations 306 and 308 may correspond to operations 108 and 110, and/or operation 316 may correspond to operations 114 and/or 214.

Session Control Component 301 may, in some embodiments, receive (at 302) a message from TAS 103, requesting a spam analysis for a given call request. For example, the spam analysis may be based on a call request received by TAS 103 from calling UE 101-1 (e.g., at 102, as described above). The message (received at 302) may include a SIP message, such as a SIP INVITE message. In some embodiments, the message (received at 302) may include identifying information for calling UE 101-1 and/or for the call request received from calling UE 101-1, such as Session Description Protocol ("SDP") information. This information may be used by MLSDC 105 (e.g., by Session Control Component 301 and/or MLAAC 303) to communicate with calling UE 101-1, such as to receive audio from calling UE 101-1 in order to analyze the call request for potential spam.

Session Control Component 301 and MLAAC 303 may perform (at 304) an establishment procedure to establish a call recording session or other type of communication session via which call audio may be provided to MLAAC 303 for analysis. In some embodiments, establishing the call recording session and/or communication session may include sending, from Session Control Component 301, a SIPREC INVITE message to MLAAC 303, and receiving one or more SIPREC OK messages from MLAAC 303.

Session Control Component 301 may further output (at 306) a screening indication to calling UE 101-1. For example, calling UE 101-1 may use the SDP information, provided in the SIP INVITE (at 302), to communicate with calling UE 101-1. In some embodiments, the screening indication may be provided via Real-time Transport Protocol ("RTP"), such as RTP over User Datagram Protocol ("UDP"). In some embodiments, TAS 103 may utilize one or more other suitable protocols to send the screening indication to calling UE 101-1. As discussed above, the screening indication may include an audible indication or prompt, indicating that the call request is being screened for spam detection purposes. Session Control Component 301 may further receive (at 308) a screening indication response from calling UE 101-1, which may also be received via RTP and/or some other suitable protocol. In some embodiments, Session Control Component 301 may limit the duration of the screening indication response to a predetermined timer duration (e.g., may stop "listening" after a threshold amount of time has passed after sending (at 306) the screening indication). Limiting the duration of the screening response may ensure that a user (e.g., associated with callee UE 101-2) may not have to wait too long for the spam analysis, such as situations where the user has chosen to place the call request on hold while the spam analysis is performed.

Once MLAAC 303 has completed the spam analysis, MLAAC 303 may provide (at 314) a result of the analysis to Session Control Component 301. For example, MLAAC 303 may send a SIPREC REINVITE to Session Control Component 301 and/or some other type of suitable message. The SIPREC REINVITE message may include an indication of the result of the spam analysis, such as a binary indicator of whether the call request is spam (e.g., "Spam" or "Not spam") and/or some other indicator of a likelihood that the call request is spam (e.g., a score). The SIPREC REINVITE may include session information, such as SDP information, that may be used by Session Control Component 301 to uniquely identify this particular call request, as opposed to other call requests (e.g., associated with other UEs 101), which may also be concurrently analyzed.

Session Control Component 301 may notify (at 316) TAS 103 of the result of the spam analysis. For example, Session Control Component 301 may provide (at 316) a SIP NOTIFY message or some other suitable type of message to TAS 103. As similarly discussed above, TAS 103 may output (at 318) a message to calling UE 101-1, indicating whether the call request has been rejected or will be allowed to proceed. This message may include, for example, a SIP REINVITE message (e.g., when the call request will be allowed to proceed) or a SIP BYE message (e.g., when the call request is rejected). As similarly discussed above, in situations where the call request is allowed to proceed (e.g., when MLAAC 303 and/or TAS 103 have determined that the call request is not spam, and/or have not determined that the call request is spam), TAS 103 may perform one or more other suitable operations in order to establish the call between calling UE 101-1 and callee UE 101-2, and/or to notify callee UE 101-2 of the call request from calling UE 101-1.

Figure 4:
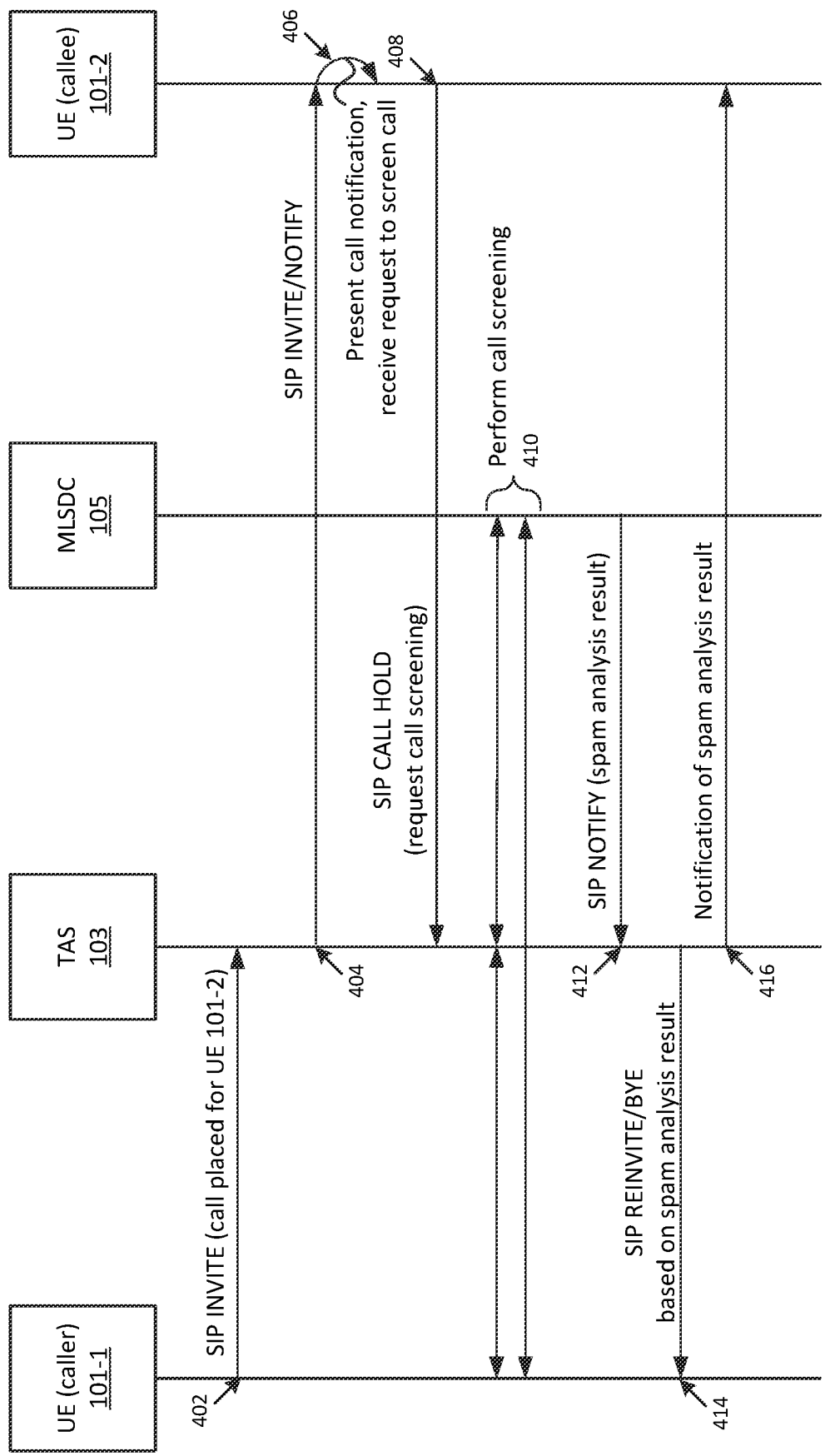
FIG. 4 illustrates example signaling in which a UE may request that a particular call be screened to determine whether the call request is spam.

FIG. 4 illustrates example signaling in which a UE may request that a particular call request be screened to determine whether the call request is spam. For example, as shown, callee UE 101-2 may receive (at 404) a message indicating that a call request has been received for callee UE 101-2 from calling UE 101-1 (e.g., based on a SIP INVITE or other suitable message at 402). The message (received at 404) may include a SIP INVITE message, a SIP NOTIFY message, and/or some other suitable message. Based on this message, callee UE 101-2 (e.g., via an API implemented by callee UE 101-2) may present (at 406) a call notification, indicating that a call request has been received for callee UE 101-2. The call notification may include, for example, a MDN or other identifier of calling UE 101-1. In this manner, a user of callee UE 101-2 may be presented with an opportunity to determine whether further spam analysis should be performed on the call request. For example, if the identity of the caller is unknown to the user (e.g., if the MDN of calling UE 101-1 is not in an address book of UE 101-2, and/or if the user does not recognize the caller), the user may select an option for further analysis of the call request.

In some embodiments, as discussed above, in lieu of presenting (at 406) a notification, UE 101-2 may automatically, without user interaction, determine that the call request should be further screened. For example, the message from TAS 103 (received at 404) may include an initial spam score or other indication, based on which callee UE 101-2 may determine, without further user interaction or notification, that the call request should be further analyzed for spam detection purposes. Based on the user interaction or the automatic determination, in some embodiments, callee UE 101-2 may output (at 408) a request to TAS 103 for further analysis to be performed on the call request. In some embodiments, the request (at 408) may include a request to place the call request in a "hold" status, such as a SIP CALL HOLD message.

Such analysis may be performed (at 410), in a manner similar to that described above with respect to FIGS. 1-3. For the sake of brevity, the analysis is represented in FIG. 4 as arrows 410, and is not discussed again at length here. After performing the spam analysis on the call request, MLSDC 105 may output (at 412) a result of the spam analysis, which may include a binary indication of whether the call request is spam, and/or a score or other measure of likelihood that the call request is spam. In some embodiments, this indication may be provided via a SIP NOTIFY message or some other suitable type of message.

As discussed above, TAS 103 may output (at 414) a message to calling UE 101-1 based on the spam analysis result, which may include a message based on rejection of the call request (e.g., a SIP BYE message) or a message based on allowing the call request to proceed (e.g., a SIP REINVITE message).

TAS 103 may also notify (at 416) callee UE 101-2 of the spam analysis result. In situations where the spam analysis resulted in a determination that the call request is spam, callee UE 101-2 (e.g., an API executing at callee UE 101-2) may present a notification that the call request was blocked. This notification may include an MDN or other identifier associated with calling UE 101-1. The notification may include one or more selectable options, such as an option to call calling UE 101-1, add calling UE 101-1 to an address book, add calling UE 101-1 to a block list, and/or other options. As discussed below, selection of a particular option may be used by MLSDC 105 to refine one or more models based on which MLSDC 105 classifies call requests as spam (e.g., call requests from calling UE 101-1, or other call requests with similar attributes, such as call requests that are associated with the same words and phrases, sound signatures, etc.).

In situations where the spam analysis resulted in a determination that the call request is not spam, callee UE 101-2 may place the call off hold (e.g., if the call was placed on hold at 408), and/or may request to TAS 103 that the call be removed from a "hold" status. Additionally, or alternatively, callee UE 101-2 may begin ringing only after receiving (at 416) a notification that the call request is not spam. MLSDC 105 may, in some embodiments, determine one or more actions performed by or via callee UE 101-2 after the notification that the call request is not spam. For example, MLSDC 105 may determine whether the call request was answered, a duration of the ensuing call, whether the caller was added to an address book of callee UE 101-2, and/or other actions. As similarly noted above, these types of interactions may be used by MLSDC 105 to refine one or more models based on which MLSDC 105 classifies call requests as spam. In some embodiments, callee UE 101-2 may implement an API and/or other suitable functionality to communicate with MLSDC 105, to indicate actions that were performed after receiving a call request and/or a spam analysis result associated with a call request, based on which MLSDC 105 may refine one or more models used to detect spam.

Figure 5:
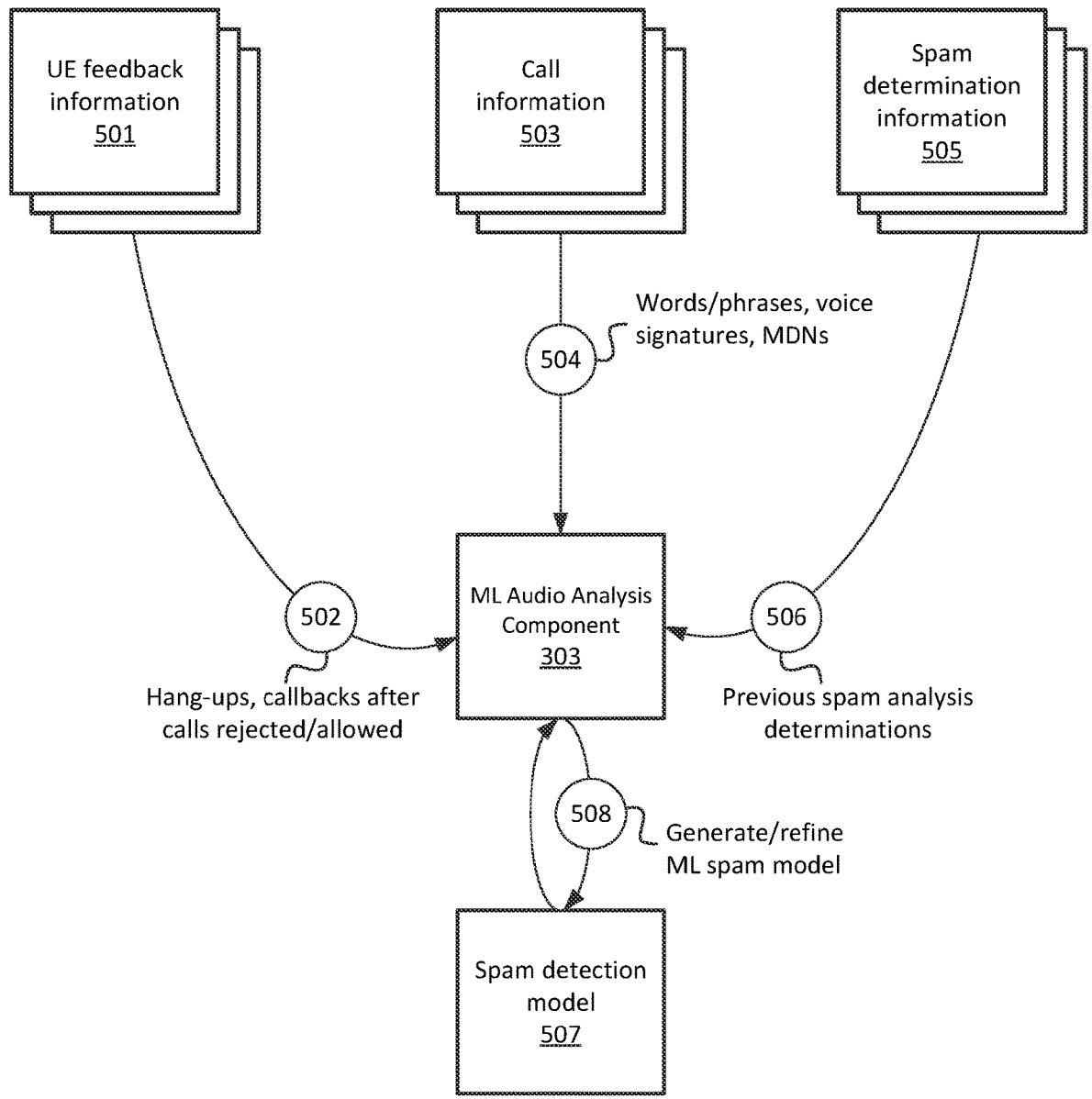
FIG. 5 illustrates the example generation and/or refinement of a machine learning model, based on which an audio analysis of call requests may be performed to determine whether the call requests are spam.

FIG. 5 illustrates the example generation and/or refinement of one or more such models, based on which an analysis of call requests may be performed to determine whether the call requests are spam. MLAAC 303 may receive (at 502), for example, UE feedback information 501 from one or more UEs 101 (e.g., UEs 101 that have received call requests). For example, MLAAC 303 may receive, such as via an API implemented by UEs 101, information indicating whether particular call requests were answered or ignored, such as call requests that were determined as not being spam and/or otherwise allowed to be provided to UEs 101.

For example, if a particular call request was indicated as not spam, and a particular UE 101 did not answer the call, or a "decline" option was selected (e.g., rejecting the call before the call is sent to voicemail), then MLSDC 105 (e.g., MLAAC 303) may refine (at 508) spam detection model 507 to increase the likelihood that similar call requests (e.g., from the same caller, and/or having the same or similar attributes, such as words and phrases, sound signatures, or the like) are determined as being spam in the future. Similarly, if a particular call request was indicated as not spam, and the call was answered and relatively quickly (e.g., within a threshold amount of time, such as 5 seconds) ended, this may also be an indicator that the call request should have been classified as spam, and MLAAC 303 may refine (at 303) spam detection model 507 accordingly.

As another example, UE feedback information 501 may include information regarding calls placed by UEs 101, which may include calls to callers from whom call requests have been identified as spam. For example, if a particular UE 101 calls back a caller from whom a call request has been identified as spam, this may be an indicator that the classification of the call request as spam was incorrect, and that that call requests having similar attributes should be less likely to be classified as spam in the future.

In order to refine (at 508) spam detection model 507, MLAAC 303 may also make use of call information 503 (received at 504) and spam determination information 505 (received at 506). For instance, in the examples provided above, call information 503 (e.g., words, phrases, sound signatures, MDNs, etc.) may be used to refine spam detection model 507 for classifications of spam for call requests sharing similar attributes. Similarly, spam determination information 505 (e.g., previous determinations of whether given call requests) may also be used to refine spam detection model 507. For example, a likelihood that a classification of particular attributes as being associated with spam may be more heavily adjusted when UE feedback information 501 indicates that the classification may have been incorrect.

MLAAC 303 may receive (at 502) UE feedback information 501 from one or more UEs 101, such as from one or more APIs implemented by UEs 101 that are configured to communicate with MLAAC 303. MLAAC 303 may receive or determine (at 504) call information 503 based on call audio from one or more calling UEs 101, such as call audio provided (e.g., at 110) as part of a call screening process. In some embodiments, in addition to, or in lieu of, receiving audio, MLAAC 303 may receive video, a text transcript, metadata, or other information derived from audio and/or video. As noted above, while examples are discussed here in the context of voice/audio calls, similar concepts may apply for video calls or other types of calls or messaging. MLAAC 303 may also receive or determine (at 506) spam determination information 505 based on previous iterations of a spam analysis process performed on past call requests. MLAAC 303 may receive (at 502, 504, and/or 506) such information on an ongoing basis, and may refine (at 508) spam detection model 507 on an ongoing basis. In this manner, spam detection model 507 may continue to be improved, and resulting spam analyses may continue to be improved, on an ongoing basis.

Figure 6:
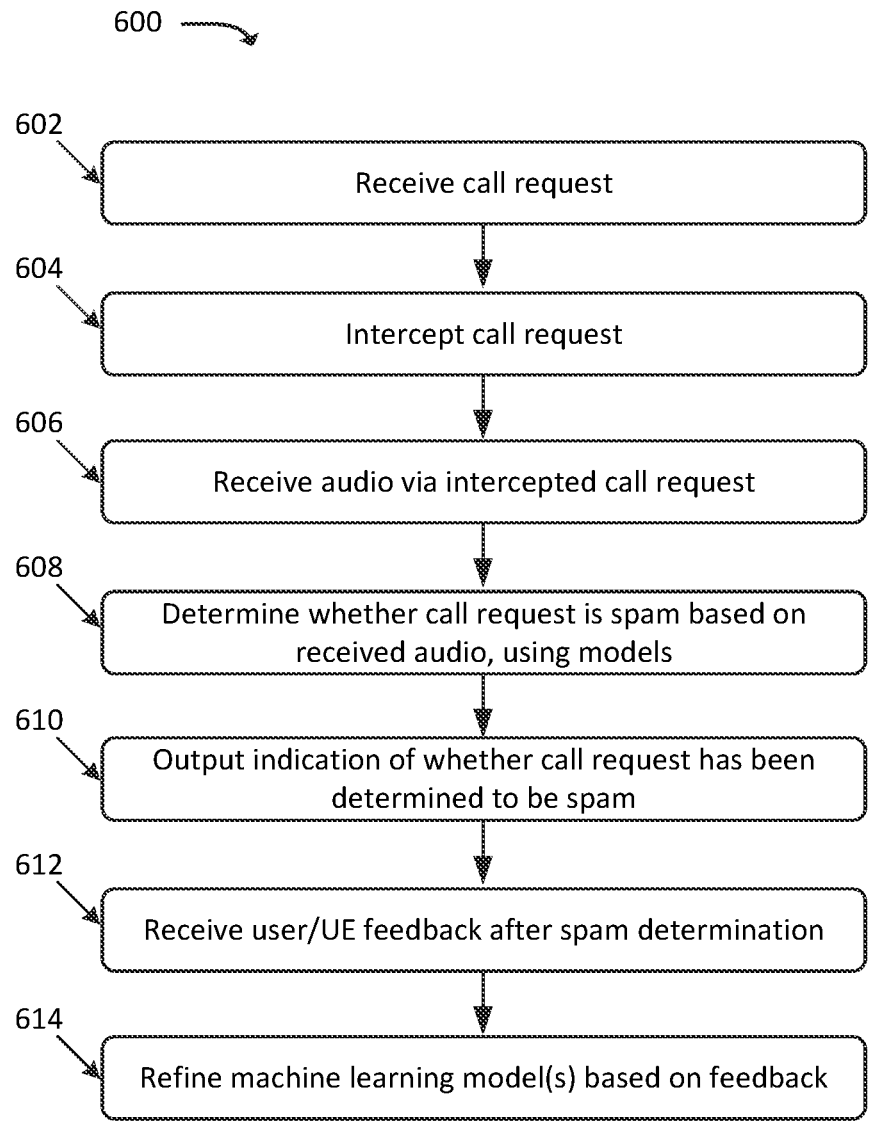
FIG. 6 illustrates an example process for performing a spam detection analysis on a call request based on one or more machine learning models, and the refinement of such models based on one or more actions taken after the spam detection analysis was performed.

FIG. 6 illustrates an example process for performing a spam detection analysis on a call request based on one or more machine learning models, and the refinement of such models based on one or more actions taken after the spam detection analysis was performed. In some embodiments, some or all of process 600 may be performed by MLSDC 105 (e.g., Session Control Component 301 and/or MLAAC 303). In some embodiments, one or more other devices may perform some or all of process 600 in concert with, and/or in lieu of, MLSDC 105. For the sake of example, process 600 will be described in the context of MLSDC 105, while in practice, Session Control Component 301, MLAAC 303 may perform one or more of the operations of process 600, as discussed herein.

As shown, process 600 may include receiving (at 602) a call request. For example, MLSDC 105 may receive a call request and/or other indication that UE 101 (e.g., calling UE 101-1) has placed a call intended for callee UE 101-2. The call request may be associated with a Voice over IP ("VoIP") call, a Voice over Long-Term Evolution ("VoLTE") call, and/or some other type of call. In some embodiments, the call request may be, or may include, a SIP message, such as a SIP INVITE message.

Process 600 may further include intercepting (at 604) the call request. For example, MLSDC 105 may place the call on a "hold" status. As further discussed above, MLSDC 105 may utilize a SIPREC protocol to begin recording or otherwise receive call audio from calling UE 101-1. Generally speaking, MLSDC 105 may "answer" the call request, and may output an indication that the call is being analyzed for spam.

Process 600 may additionally include receiving (at 606) call audio via the intercepted call request. For example, MLSDC 105 may receive, from calling UE 101-1, audio provided by calling UE 101-1 (e.g., a user of calling UE 101-1 or, in some instances, an automated recording).

Process 600 may also include determining (at 608) whether the call request is spam based on the received audio, using one or more models. For example, as discussed above, MLSDC 105 may use AI, machine learning, and/or other suitable techniques to determine whether attributes of the call request (e.g., words or phrases included in the received (at 606) audio, sound signatures in the received audio, etc.) match one or more models of call requests that should be classified as spam.

Process 600 may further include outputting (at 610) an indication of whether the call request has been determined (at 608) to be spam. For example, MLSDC 105 may output (e.g., to calling UE 101-1 and/or to callee UE 101-2) an indication that the call request is spam or not spam, may provide a score indicating a likelihood that the call request is spam, and/or may otherwise indicate a probability or likelihood that the call request is spam. As discussed above, in situations where the call request is determined to be spam, MLSDC 105 may output (at 610) an instruction to calling UE 101-1 and/or callee UE 101-2 to end the call. On the other hand, in situations where the call request is determined not to be spam (and/or a score or likelihood that the call request is spam is below a threshold), MLSDC 105 may indicate (e.g., to calling UE 101-1 and/or callee UE 101-2) that the call request is not spam, based on which calling UE 101-1 and callee UE 101-2 may establish a communication session, and/or based on which calling UE 101-1 may present a notification (e.g., may "ring") that the call request has been received.

Process 600 may additionally include receiving (at 612) user and/or UE feedback after the spam determination. For example, as discussed above, MLSDC 105 may determine whether UE 101-2 answered the call (if the call request was allowed to proceed), and/or how long the ensuing call was if the call was answered. As another example, MLSDC 105 may determine whether callee UE 101-2 called calling UE 101-1, sent calling UE 101-1 a message (e.g., a Short Message Service ("SMS") message, a Multimedia Messaging Service ("MMS") message, or the like), added calling UE 101-1 to an address book, or performed other similar operations that may suggest that the call request was incorrectly classified as spam.

Process 600 may also include refining (at 614) one or more models based on the feedback. For example, as discussed above, MLSDC 105 (e.g., MLAAC 303) may refine the one or more models based on the classification of the call request as spam or not spam, UE feedback information, and/or other suitable information. As discussed above, the models may be refined on an ongoing basis, in order to continually improve the accuracy of the models.

Figure 7:
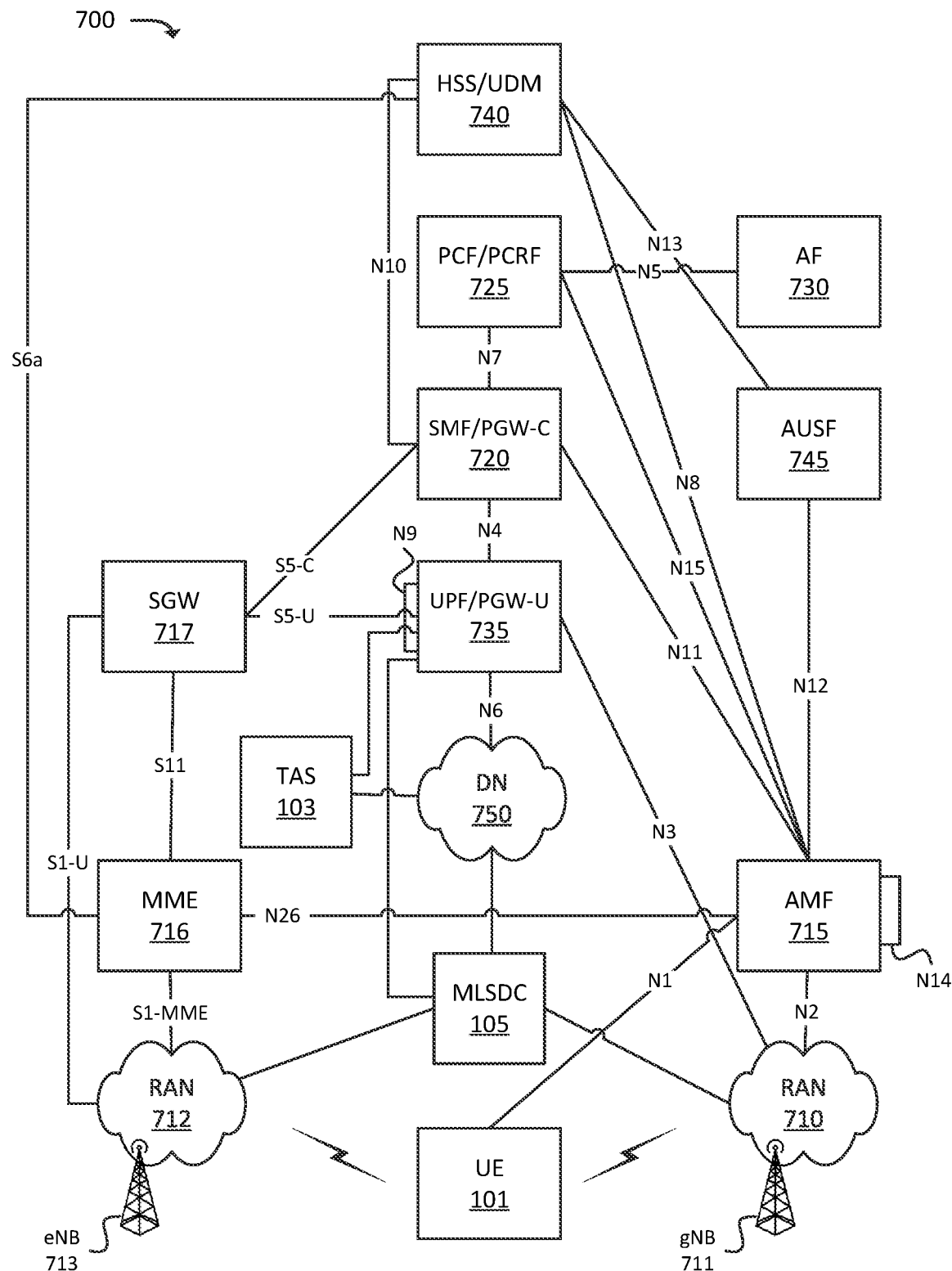
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, Authentication Server Function ("AUSF") 745, and MLSDC 105. Environment 700 may also include one or more networks, such as Data Network ("DN") 750.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710 and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 701 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, an LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

TAS 103 may include one or more devices, systems, VNFs, etc. that provide communication services, such as voice call services, video call services, messaging services, or the like. In some embodiments, TAS 103 may be included in, and/or may be communicatively coupled to, one or more CSCFs, an IMS network, and/or one or more other devices, systems, or networks. Generally, TAS 103 may receive call requests and serve to connect the call requests to an intended recipient. As discussed above, TAS 103 may, in concert with MLSDC 105, determine whether certain call requests should be rejected or allowed to be completed, based on a spam analysis (e.g., as performed by MLSDC 105).

MLSDC 105 may include one or more devices, systems, VNFs, etc. that perform one or more functions described above. As discussed above, MLSDC 105 may include one or more components, such as Session Control Component 301 and/or MLAAC 303. In some embodiments, MLSDC 105 may be geographically distributed, and/or particular components of MLSDC 105 may be implemented by discrete devices or systems. In some embodiments, as discussed below, multiple instances of MLSDC 105 (and/or components of MLSDC 105) may be distributed, such as at the "edge" of RANs 710 and/or 712, in order to provide communications with relatively low latency. In some embodiments, MLSDC 105 may be included in, and/or may be communicatively coupled to, one or more CSCFs, an IMS network, and/or one or more other devices, systems, or networks.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
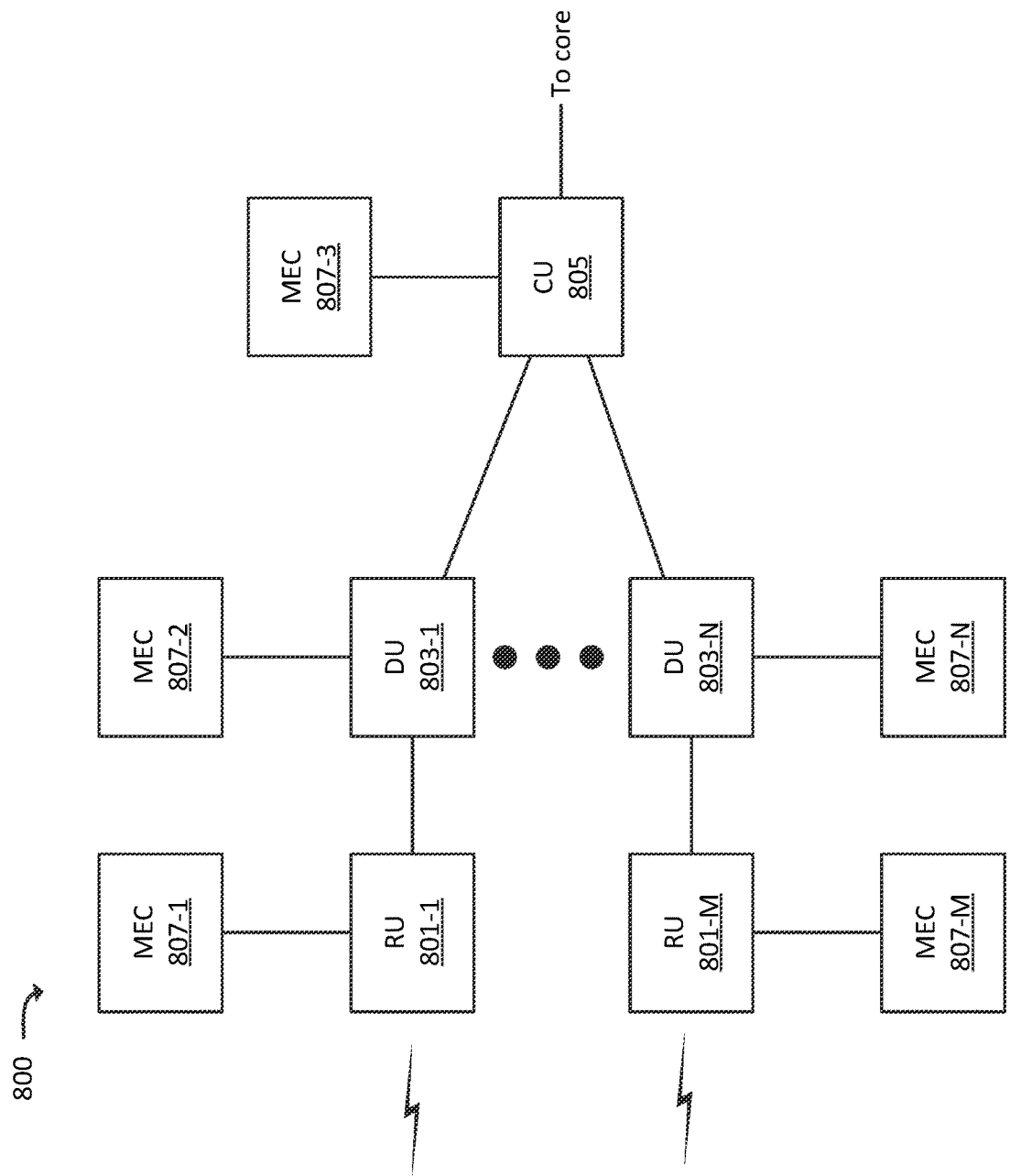
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Control Unit ("CU") 805, one or more Distributed Units ("DUs") 803-1 through 803-N (referred to individually as "DU 803," or collectively as "DUs 803"), and one or more Remote Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 1103-N may be communicatively coupled to MEC 807-N, CU 1105 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. MEC 807 may include, and/or may implement some or all of the functionality described above with respect to TAS 103 and/or MLSDC 105, in some embodiments.

Figure 9:
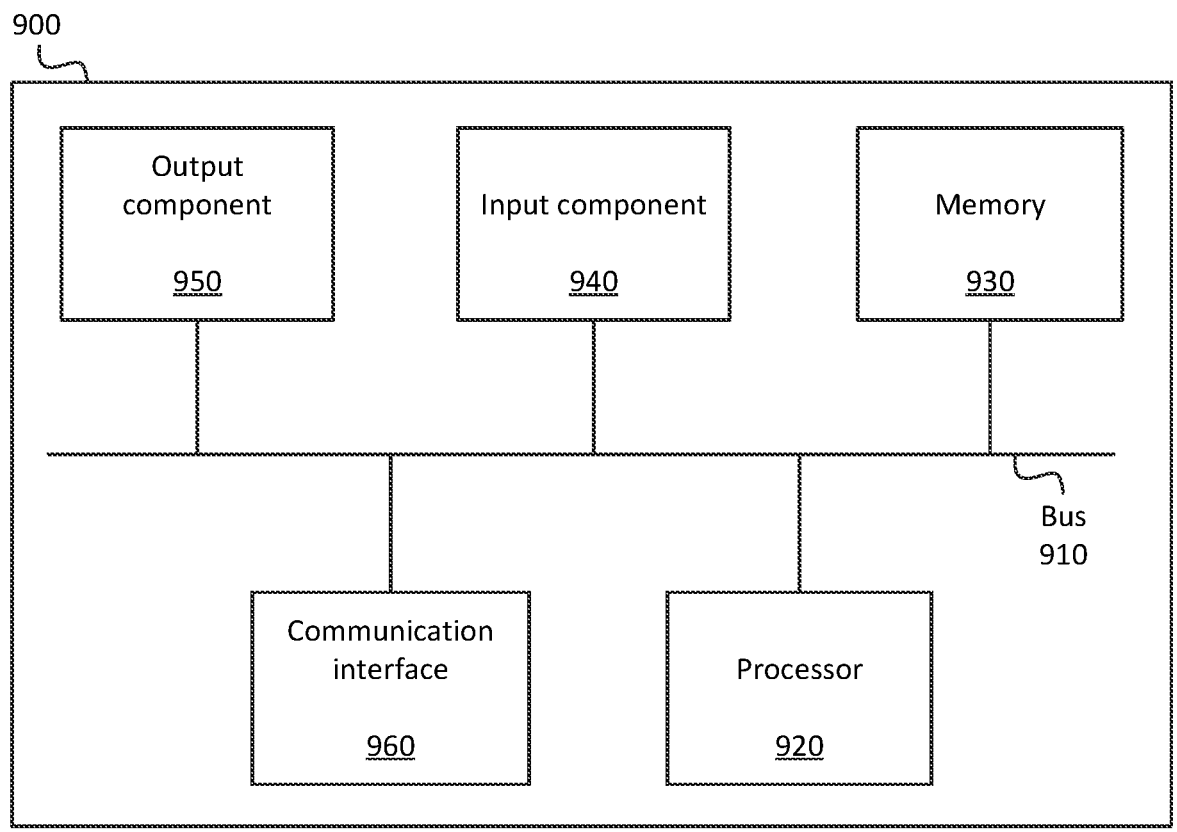
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        receive a first request to establish a first call between a first User Equipment ("UE") and a second UE;
        notify the second UE of the first request to establish the first call;
        receive, from the second UE, a second request to indicate whether the first request to establish the first call is associated with a particular classification;
        determine, based on receiving the second request, whether the first request is associated with the particular classification; and
        output, to the second UE, an indication of whether the first request is associated with the particular classification,
            wherein when the indication indicates that the first request is associated with the particular classification, the second UE forgoes outputting a notification, to a user of the second UE, of the first request; and
            wherein when the indication indicates that the first request is not associated with the particular classification, the second UE outputs the notification, to the user of the second UE, of the first request.

2. The device of claim 1, wherein the one or more processors are further configured to:
    request, based on receiving the second request, the audio from the first UE, wherein the audio is received from the first UE based on the request for the audio,
    wherein determining whether the first request is associated with the particular classification is further based on the audio received from the first UE.

3. The device of claim 2, wherein the requested call between the first UE and the second UE is a first call, wherein the audio is received via a second call between the device and the first UE.

4. The device of claim 3, wherein the one or more processors are further configured to:
    establish the second call between the device and the first UE based on receiving the second request from the second UE.

5. The device of claim 4, wherein the one or more processors are further configured to:
    determine, based on attributes of the first UE, that the first UE is potentially associated with the particular classification,
    wherein establishing the second call between the device and the first UE is based on determining that the first UE is potentially associated with the particular classification.

6. The device of claim 1, wherein the particular classification includes a spam classification.

7. A non-transitory computer-readable medium, storing a plurality of processor-executable instructions to:
    receive a first request to establish a first call between a first User Equipment ("UE") and a second UE;
    notify the second UE of the first request to establish the first call;

receive, from the second UE, a second request to indicate whether the first request to establish the first call is associated with a particular classification;

determine, based on receiving the second request, whether the first request is associated with the particular classification; and output, to the second UE, an indication of whether the first request is associated with the particular classification, wherein when the indication indicates that the first request is associated with the particular classification, the second UE forgoes outputting a notification, to a user of the second UE, of the first request; and wherein when the indication indicates that the first request is not associated with the particular classification, the second UE outputs the notification, to the user of the second UE, of the first request.

8. The non-transitory computer-readable medium of claim 7, wherein the plurality of processor-executable instructions further include processor-executable instructions to:

request, based on receiving the second request, the audio from the first UE, wherein the audio is received from the first UE based on the request for the audio, wherein determining whether the first request is associated with the particular classification is further based on the audio received from the first UE.

9. The non-transitory computer-readable medium of claim 8, wherein the requested call between the first UE and the second UE is a first call, wherein the audio is received via a second call between associated with the first UE.

10. The non-transitory computer-readable medium of claim 9, wherein the plurality of processor-executable instructions further include processor-executable instructions to:

establish the second call between the device and the first UE based on receiving the second request from the second UE.

11. The non-transitory computer-readable medium of claim 10, wherein the plurality of processor-executable instructions further include processor-executable instructions to:

determine, based on attributes of the first UE, that the first UE is potentially associated with the particular classification, wherein establishing the second call with the first UE is based on determining that the first UE is potentially associated with the particular classification.

12. The non-transitory computer-readable medium of claim 7, wherein the particular classification includes a spam classification.

13. A method, comprising:

receiving a first request to establish a call between a first User Equipment ("UE") and a second UE;

notifying the second UE of the first request to establish the first call;

receiving, from the second UE, a second request to indicate whether the first request to establish the first call is associated with a particular classification;

determining, based on receiving the second request, whether the first request is associated with the particular classification; and outputting, to the second UE, an indication of whether the first request is associated with the particular classification, wherein when the indication indicates that the first request is associated with the particular classification, the second UE forgoes outputting a notification, to a user of the second UE, of the first request; and wherein when the indication indicates that the first request is not associated with the particular classification, the second UE outputs the notification, to the user of the second UE, of the first request.

14. The method of claim 13, the method further comprising:

requesting, based on receiving the second request, audio from the first UE, wherein the audio is received from the first UE based on the request for the audio, wherein determining whether the first request is associated with the particular classification is further based on the audio received from the first UE.

15. The method of claim 14, wherein the requested call between the first UE and the second UE is a first call, wherein the audio is received via a second call associated with the first UE.

16. The method of claim 15, further comprising:

establishing the second call between the device and the first UE based on receiving the second request from the second UE.

17. The method of claim 13, wherein the particular classification includes a spam classification.

18. The method of claim 13, wherein the second UE outputs the second request automatically.

19. The device of claim 1, wherein the second UE outputs the second request automatically.

20. The non-transitory computer-readable medium of claim 7, wherein the second UE outputs the second request automatically.

* * * * *